(12) United States Patent
Jobson et al.

(10) Patent No.: US 7,351,383 B2
(45) Date of Patent: Apr. 1, 2008

(54) DEVICE FOR CATALYTIC TREATMENT OF A GAS FLOW

(75) Inventors: Edward Jobson, Romelanda (SE); Tommy Simonsson, Stenungsund (SE); Sören Udd, Nödinge (SE)

(73) Assignee: Volvo Lastvagnar AB, Gothenburg (SE)

( * ) Notice: Subject to any disclaimer, the term of this patent is extended or adjusted under 35 U.S.C. 154(b) by 748 days.

(21) Appl. No.: 10/249,396

(22) Filed: Apr. 4, 2003

(65) Prior Publication Data

US 2003/0185726 A1    Oct. 2, 2003

Related U.S. Application Data

(63) Continuation of application No. PCT/SE01/02077, filed on Sep. 25, 2001, now abandoned.

(30) Foreign Application Priority Data

Oct. 4, 2000   (SE) .................................... 0003579

(51) Int. Cl.
*F01N 3/28*   (2006.01)
*B01D 53/94*   (2006.01)

(52) U.S. Cl. ...................... 422/180; 422/176; 422/177; 60/299

(58) Field of Classification Search ................. 422/180
See application file for complete search history.

(56) References Cited

U.S. PATENT DOCUMENTS

| | | | |
|---|---|---|---|
| 3,302,394 A | * | 2/1967 | Alden et al. .................. 60/302 |
| 4,206,178 A | | 6/1980 | Oya et al. |
| 5,365,735 A | | 11/1994 | Weber et al. |
| 5,388,407 A | | 2/1995 | Capers et al. |

FOREIGN PATENT DOCUMENTS

| | | | |
|---|---|---|---|
| DE | 2725943 A1 | | 12/1978 |
| DE | 19510606 A1 | | 9/1996 |
| GB | 2030221 A | | 4/1980 |
| GB | 2054402 A | | 2/1981 |
| JP | 52013021 A | * | 2/1977 |
| JP | 04271846 A | * | 9/1992 |
| JP | 08296433 A | | 12/1996 |
| WO | WO 9937897 A1 | | 7/1999 |

* cited by examiner

*Primary Examiner*—Glenn Caldarola
*Assistant Examiner*—Jennifer A. Leung
(74) *Attorney, Agent, or Firm*—Novack Druce + Quigg LLP

(57) ABSTRACT

Device for catalytic treatment of a gas flow including at least one body (1) that includes a catalytic material. The device has a number of first openings (5) for either entry of gas into or exit of gas from the catalyzer body (1), and a second opening (6) for either exit of the gas entering through the first openings or entry of gas into the catalyzer body (1) for subsequent exit through the first openings.

17 Claims, 6 Drawing Sheets

4a

4b

4c

4d

4e

4f

DEVICE FOR CATALYTIC TREATMENT OF A GAS FLOW

CROSS REFERENCE TO RELATED APPLICATIONS

The present application is a continuation patent application of International Application No. PCT/SE01/02077 filed Sep. 25, 2001 which was published in English pursuant to Article 21(2) of the Patent Cooperation Treaty and which claims priority to Swedish Patent Application No. 0003579-0 filed Oct. 4, 2000. Both applications are expressly incorporated herein by reference in their entireties.

BACKGROUND OF INVENTION

1. Field of the Invention

The present invention relates to a device for catalytic treatment of a gas flow comprising (including, but not limited to) at least one body which includes a catalytic material. The device has a number of first openings for either entry of gas into, or exit of gas from, the catalyzer body. A second opening is provided for either the exit of the gas entering through the first openings, or entry of gas into the catalyzer body for subsequent exit through the first openings. The first openings are open outward, from the catalyzer body, on a portion of the body at a distance from a first delimiting surface thereof, toward which delimiting surface the body is adapted to guide at least some of the incoming gas.

In all combustion of hydrocarbon fuel, for example petrol and diesel oil, exhaust gases are formed. Such exhaust gases include uncombusted or partially combusted fuel thereby establishing a mixture that includes hydrocarbons (HC), carbon monoxide (CO), carbon dioxide (CO2) and water. Nitrogen gas and oxygen also combine to form nitrogen oxides (NOx).

In a catalytic device, the aim is to supply oxygen to the carbon monoxide of the exhaust gases so that carbon dioxide is formed, and to supply oxygen to the uncombusted hydrocarbon so that it is combusted completely to form carbon dioxide and water. Furthermore, it is desirable to remove oxygen from the nitrogen oxides so that molecular nitrogen is formed.

It is possible to bring about such reaction(s) by means of a device in which the gas is brought into contact with a catalytic material. This reaction also takes place at lower temperatures, but is in the main set going at a certain elevated temperature, usually roughly 300° C.

2. Background Art

Devices for catalytic treatment of a gas flow are usually referred to as catalyzers and are previously known. For catalytic treatment of exhaust gases from a vehicle, the device can be arranged directly after the cylinders of the internal combustion engine. The branch pipes from the cylinders can then be brought together at a junction, and a common pipe for the gases connects the junction to the catalytic device. A disadvantage of such devices is that the pressure pulse from one cylinder can penetrate another cylinder during the gas exchange phase, a characteristic associated with power and efficiency losses.

SUMMARY OF INVENTION

One objective of the invention is to produce or provide a device for catalytic treatment of a gas flow which occupies a smaller volume in relation to previously known such devices, or at least has such a construction that, for a given application, it leads to more efficient use of available space. Such an application is a case in which the device is intended to be used for catalytic treatment of exhaust gases from a vehicle and is arranged directly after the engine from the vehicle. Another application is a case in which the device is intended to be used in a space that is relatively long and narrow, where proximity to the branch pipes of the engine is of secondary significance. A further object is to produce a device with a construction that affords opportunities for increased efficiency.

Advantageously, the abovementioned objective(s) are achieved according to the present invention by virtue of the fact that the catalyzer body has an elongate shape, and in that the first delimiting surface defines a first end of the body.

In the event that such a device is intended to be arranged directly after the engine, the number of first openings is suitably adapted so that the cylinders interfere with one another as little as possible. This can be affected by virtue of each cylinder having its own first opening, or by the cylinders being combined together in groups for common first openings, and the engine being controlled so that the exhaust valves from the various cylinders in a group are not open simultaneously. The first openings therefore function as inlets to the device. By virtue of such a construction, opportunities are afforded for more space-efficient arrangement after the engine in relation to previously known devices. More precisely, the device can, by virtue of suitable constructional design, be mounted closer to the engine owing to the fact that no connection of the branch pipes is required between the engine and the device.

Alternatively, the extra space obtained can be used for longer branch pipes, which has the advantage that the cylinders can be emptied to a greater extent of exhaust residues. In other words, improved gas exchange is brought about, which leads to increased efficiency and greater power.

The catalyzer body has an elongate shape, and the first delimiting surface defines a first end of the body. In other words, a part of the catalyzer body that is active for the catalytic process is present between the portion for the openings and the first end of the body.

By mounting the device in such a manner in the case described above so that the first end of the body faces toward the engine/the cylinders, space-efficient positioning of the device can be brought about. A smaller portion of the active part of the body in relation to previously known art will therefore be located on a side opposite the first end relative to the first openings.

According to a development of the preceding embodiment of the invention, the second opening is open outward, from the catalyzer body, on a portion of the body located opposite the first delimiting surface. The second opening is preferably open toward a second end of the body in its longitudinal direction. A chamber is preferably arranged at the first end of the body for the purpose of allowing a change of direction of the gases.

According to another preferred embodiment of the invention, the catalyzer body consists of a band-shaped element that is folded into a zigzag-shaped structure which forms ducts for gas throughflow. This is a cost-effective design of the catalyzer body from the point of view of manufacturing. According to a development, the catalyzer body forms a heat exchanger and the ducts are adapted in such a manner that gas entering the body can undergo heat exchange with gas exiting the body. Here, the band-shaped element is of such a nature that it allows heat exchange between two adjacent ducts. By conducting the gases in a suitable manner, advantages can be achieved as far as, for example, when what are known as cold starts are undertaken. That is to say when, during an initial period of operation of an engine, the exhaust gases have too low a temperature for the catalytic reaction to start properly.

BRIEF DESCRIPTION OF DRAWINGS

The invention will be described in greater detail below with reference to embodiments shown in the accompanying drawings and in which.

DETAILED DESCRIPTION

Figure 1:
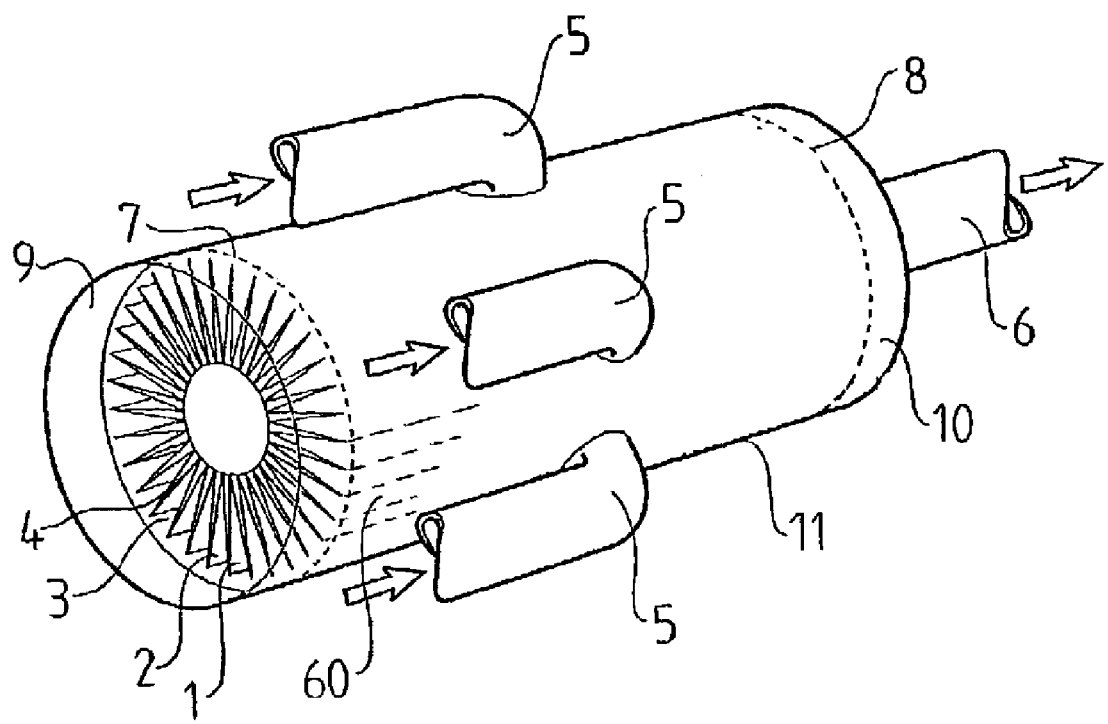
FIG. 1 is a diagrammatical perspective view of a first preferred embodiment of a device or apparatus configured according to the teachings of the present invention(s)

A first embodiment of the invention as shown in FIG. 1 relates to a device (or apparatus) for catalytic oxidation of organic substances, such as hydrocarbons, in which a heat exchanger forms part of the device. In addition to the oxidation of organic substances, the device is also well suited for other combined heat exchange and catalytic treatment of gases, for example what is known as the selective reduction of nitrogen oxides with ammonia or other reducing nitrogen compounds. The device is well suited for treatment of engine exhaust gases irrespective of whether they have a high oxygen content (diesel engines) or a low oxygen content (Otto engines).

In FIG. 1, the first preferred embodiment of the invention is illustrated. In the illustrated example, the device is connected to an internal combustion engine (not shown). The device comprises a body 1 which includes a catalytic material. The body 1 is formed from a band-shaped element 2 folded into a zigzag-shaped structure (see also FIG. 3). For the sake of simplicity, the band-shaped element is referred to below as the band. The band 2 defines the body in the form of an essentially circular cylindrical hollow cylinder. The zigzag-shaped structure forms alternating ducts 3, 4 for conducting the gas, with heat exchange between the ducts. To be precise, the ducts are present in the form of gaps that extend in the axial direction of the cylinder. The essentially rectilinear extent of the ducts 3, 4 is illustrated by the area 60 of dashed lines.

The device also includes a number of first openings 5, which in this application serve as inlets for the gas to be treated, and a second opening 6, which serves as an outlet for the gas that entered through the first openings. By virtue of suitable design of the first openings, it is possible to bring about a relatively large area for exposing the catalyzer body through the openings, which results in a reduced pressure drop of the gas on entry therethrough. The first openings 5 are arranged centrally on the body 1 in its longitudinal direction. The first openings 5 are arranged on a portion of the body at a distance from a first end 7 of the body 1. In this context, it should be appreciated that the terminology of "portion of the body" means a section thereof. In FIG. 1, the openings 5 are arranged around the body 1 at essentially the same distance from the first end 7.

Both the first openings 5 and the second opening 6 are defined in the figures by a connection device in the form of a pipe connection. Here, each of the connection devices is intended to be connected to one or more cylinders of an engine.

By virtue of the zigzag-shaped structure, every other one of the alternating ducts 3, 4 in the circumferential direction of the zigzag structure is connected to one of the first openings 5, and every other one is connected to the second opening 6. The ducts 3, 4 are moreover connected to one another in a chamber 9, 10 arranged at each end 7, 8 of the catalyzer body 1. The gas is intended to turn in these chambers, and to be returned in the alternating returning ducts.

The body 1 formed by the band 2 is arranged in a casing 11. The casing also has the shape of a hollow cylinder. The openings 5, 6 extend through the casing.

Figure 2:
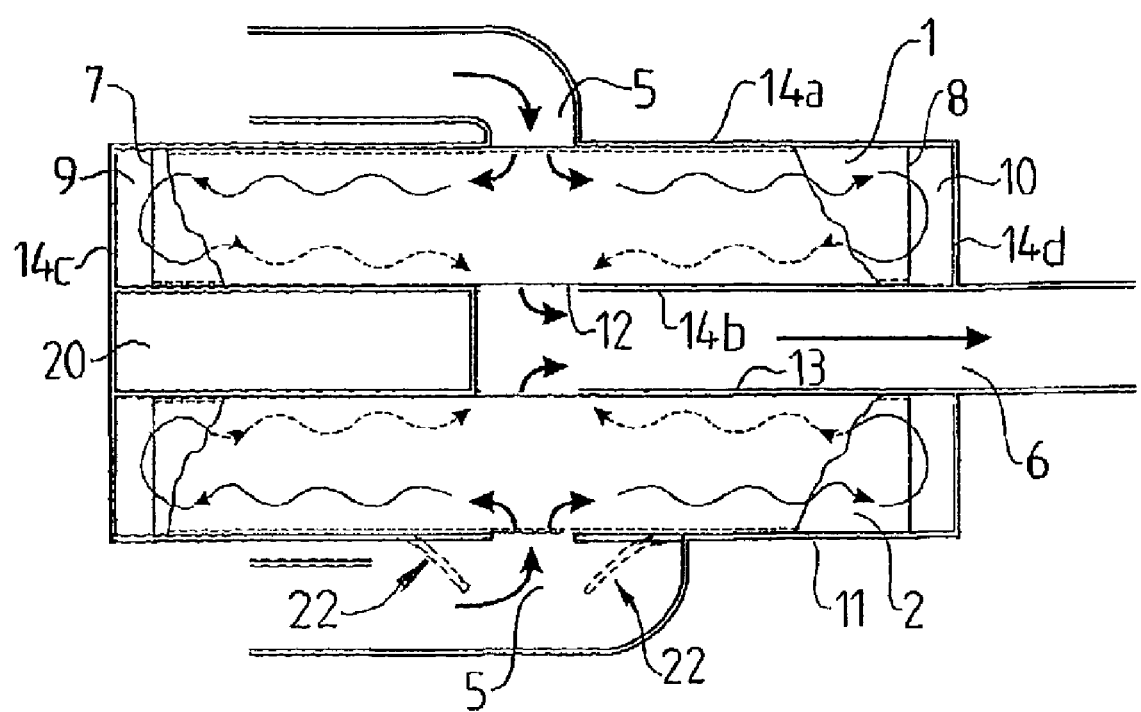
FIG. 2 is a diagrammatical partial cutaway view of the embodiment of FIG. 1 taken in a longitudinal direction of the device.

In FIG. 2, the invention according to FIG. 1 is illustrated in a diagrammatic sectional view in the longitudinal direction of the device. The delimiting walls 14a, 14b, 14c, 14d of the casing 11 enclose the body 1 in the radial direction toward the outside, toward the inside, and also in its longitudinal direction. The delimiting wall 14b of the casing, which delimits the inner cavity in the cylinder, has a central opening 12. An inner surface of an outer wall 14a of the cylindrical casing 11, which wall defines an outer lateral surface of the casing, bears against an outer delimiting surface of the catalyzer body 1.

The gas is supplied through the first openings 5. The gas from each of the first openings 5 arranged centrally along the body 2 is divided into two flows in opposite directions and flows toward the chambers 9, 10 at the ends of the body; more precisely, the gas flows in the ducts 3 on one side of the folded structure of the band.

An important detail of the arrangement for this embodiment is that the gases that flow through one opening 5 cannot be mixed directly with another opening 5 as soon as they have entered the body 2. They flow along the gaps 3 which are lamelliform so that the gases are mixed only when they reach the turning chamber 9 or 10.

A means 20 is arranged in the cavity 13 of the cylinder for the purpose of guiding the gas that flows out through the central opening 12 toward the second opening 6. The guide means or arrangement 20 is preferably cylindrical in shape with a radially outer shape which essentially corresponds to the shape of the inner delimiting surface 14b of the casing 11.

By selecting a suitable extent for the first openings 5, or alternatively by making it possible to adjust the extent, pressure drop and emission characteristics can be optimized. FIG. 2 shows an arrangement for such adjustment. In the mouth of the pipe connection that defines the lower of the first openings 5, means 22 are arranged for adjusting the effective area of the opening exposed to the catalyzer body. The adjustment means 22 comprises a movably arranged flap. The flap is adapted so as to take up at least two different positions, in a first position covering a maximum part of the opening and in a second position (see dashed position) bringing about an opening of maximum size. The flap is secured firmly at a first end. The flap comprises what is known as a bimetal, which has temperature-dependent properties. By virtue of suitable design and construction of the flap, automatic adjustment of the size of the opening can thus be achieved depending on the temperature conditions. Arranging the adjustment means constitutes an alternative embodiment. The fact that the construction with the adjustment means 22 is illustrated in only one of the first openings is to be regarded as only an illustrative example, and adjustment means can be suitably arranged in all the first openings.

The band 2 forms what is known as a membrane, which separates incoming gas from outgoing gas. The membrane is adapted in such a manner that heat can be transferred from the outgoing gas to the incoming gas but gases cannot flow freely through the membrane. The membrane is preferably arranged in such a manner that the heat exchange is brought about in a counterflow process, in which the outgoing gas heats the incoming gas just when the latter is on the way in, while the warmer, not yet cooled or heated part of the outflowing gas heats or cools the incoming gas at a late stage. This results in good heat exchange efficiency.

For good heat transfer, it is also necessary for the gas to have good transfer contact with the surface of the band. According to the invention, selected parts of the band are covered with a layer of a suitable catalytic material, which results in advantageous conditions for bringing about a high reaction rate. Intimate contact between the gas and the walls is desirable.

The band 2 consists of, for example, a thin metal plate, made of stainless steel for example, which is coated with a thin layer of a catalytic material. The band could also consist of a ceramic material that is impregnated or coated with a catalytic material. The band is coated with the catalytic material on either one or both sides. The catalyzer material can be applied intermittently or as a continuous layer.

Figure 3:
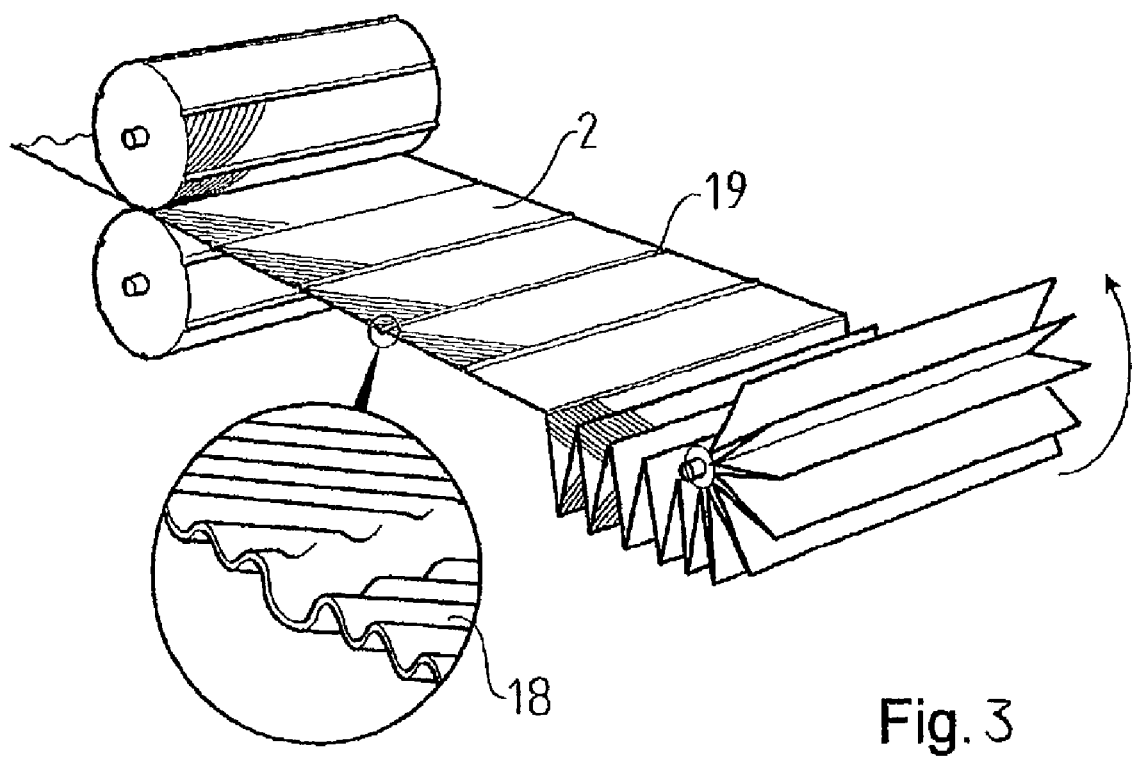
FIG. 3 is a perspective view illustrating the manufacture of a catalyzer body that forms part of the device.

For good heating of a flowing gas, the surface of the band is textured (see FIG. 3). The surface has a large number of raised portions and lowered portions 18, like a ridge/valley formation. The band is suitably corrugated. In this way, a certain turbulence is brought about in the gas. The corrugation of the band is brought about by, for example, pressing, rolling or the like (see FIG. 3). The corrugations run across the band at an angle of preferably 45-60°. The band is then folded into a zigzag shape and is shaped in such a manner that it forms a shape extending around an axis, preferably a circular shape. The corrugations in adjacent plies are arranged crosswise in relation to one another and serve as spacers between the plies of the band. For the purpose of making folding of the band easier, the corrugation pattern can be interrupted by fold indications 19 that run at right angles to the longitudinal direction of the band. The band parts present between the fold indications are rectangular in shape. Examples of suitable materials that can be used as catalytic materials are precious metals, such as platinum, rhodium or palladium. Use is preferably made of metals from the platinum group. Certain types of metal oxide can also be used.

The first openings 5 are arranged centrally relative to the body, which means that they are arranged at approximately the same distance from both ends of the body.

Figure 4:
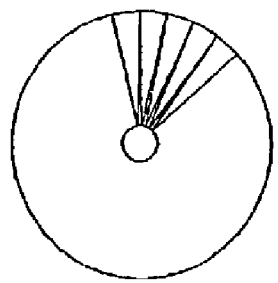
FIGS. 4a-4f illustrate several exemplary cross-sectional shapes the device may assume.
Figure 4:
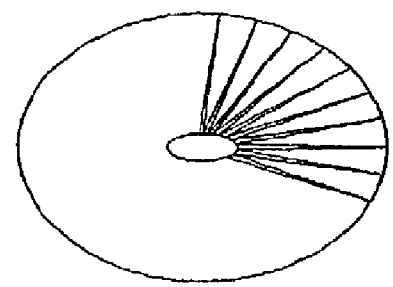
Figure 4:
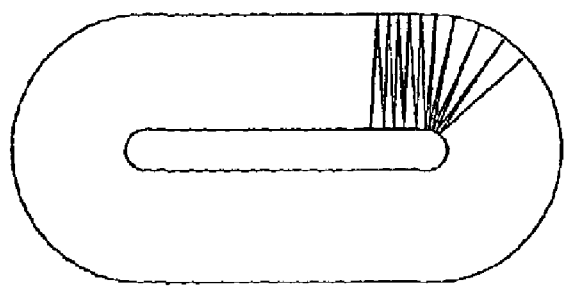
Figure 4:
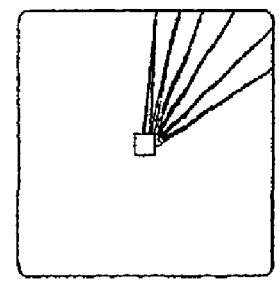
Figure 4:
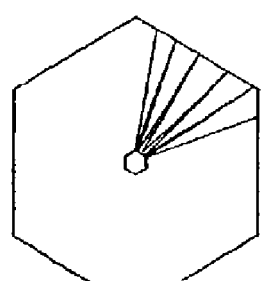
Figure 4:
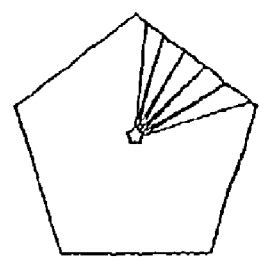

The term cylinder means a body of which the outer contours define a lateral surface that connects two base surfaces. The base surfaces can be of arbitrary shape, for example circular, oval or another rounded shape. In the event that the base surfaces are circular and parallel, the body defines a circular cylinder. The base surfaces can also define a multi-sided figure and preferably have a polygonal shape, such as a triangle, square etc. FIGS. 4a-4f show a number of different examples of cross-sectional shapes for the folded catalyzer body. To be precise, the cross-sectional shapes are: FIG. 4a, circular; 4b, oval; 4c, what is known as a race track; 4d, essentially square; 4e, a regular hexagon; and 4f, a regular pentagon. The number of corners in such a polygon suitably corresponds to the number of first openings that are arranged on the sides between the corners.

Figure 5:
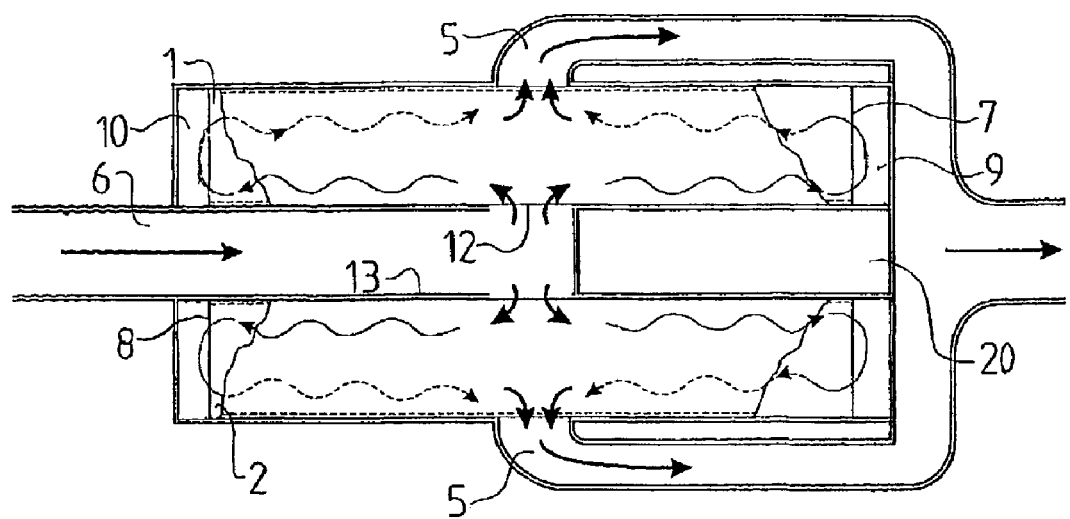
FIG. 5 is a diagrammatical partial cutaway view of an alternative embodiment of the present invention(s) taken in a longitudinal direction of the device and typifying an alternative application of the invention.

The less aggressive or harsh the environment is in which the device is located, the longer the life of the device. The life is shorter, for example, the closer the device is arranged to the engine. In some cases, it is therefore desirable to position the device far from the cylinders. In such cases, it is not as critical to keep the gas flows from the various branch pipes apart (the penetration of the pressure pulse from one branch pipe into another with the subsequent impaired efficiency is not as pronounced). There is a critical branch pipe length for this. In such a case, the device according to FIG. 2 can be operated backward (see FIG. 5); that is to say, the gas is led axially into the device through the second opening and then out radially through the first openings. In this connection, the outlet pipes can be designed with a relatively small cross-sectional area, and it is thus possible to achieve a space-efficient and relatively slender design. The advantage of this embodiment is the freedom afforded for positioning in limited spaces.

Figure 6:
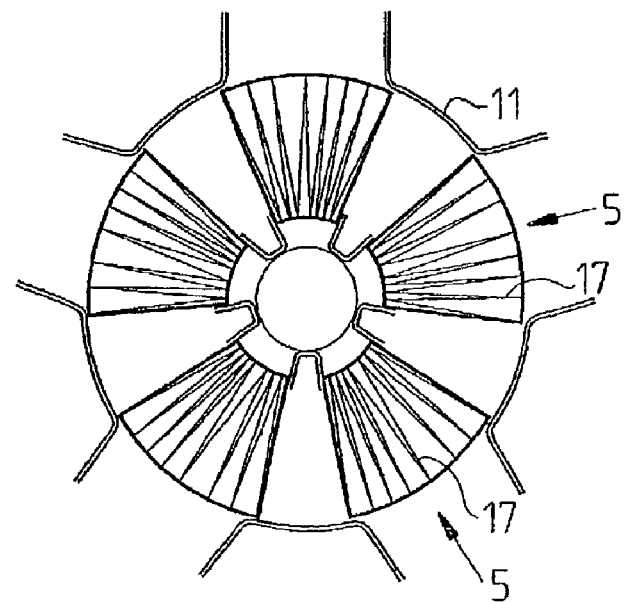
FIG. 6 is a cross-sectional view of an alternative arrangement of the device of the invention.

In FIG. 6, a second preferred embodiment of the invention is illustrated in cross-section. The device comprises a number of catalyzer bodies 17 that each form a segment of a cylinder and are enclosed in the cylindrical casing 11. The catalyzer bodies 17 are arranged with a mutual spacing along a path that extends all around and is circular in FIG. 6. Each of the first openings 5 opens toward such a body.

Figure 7:
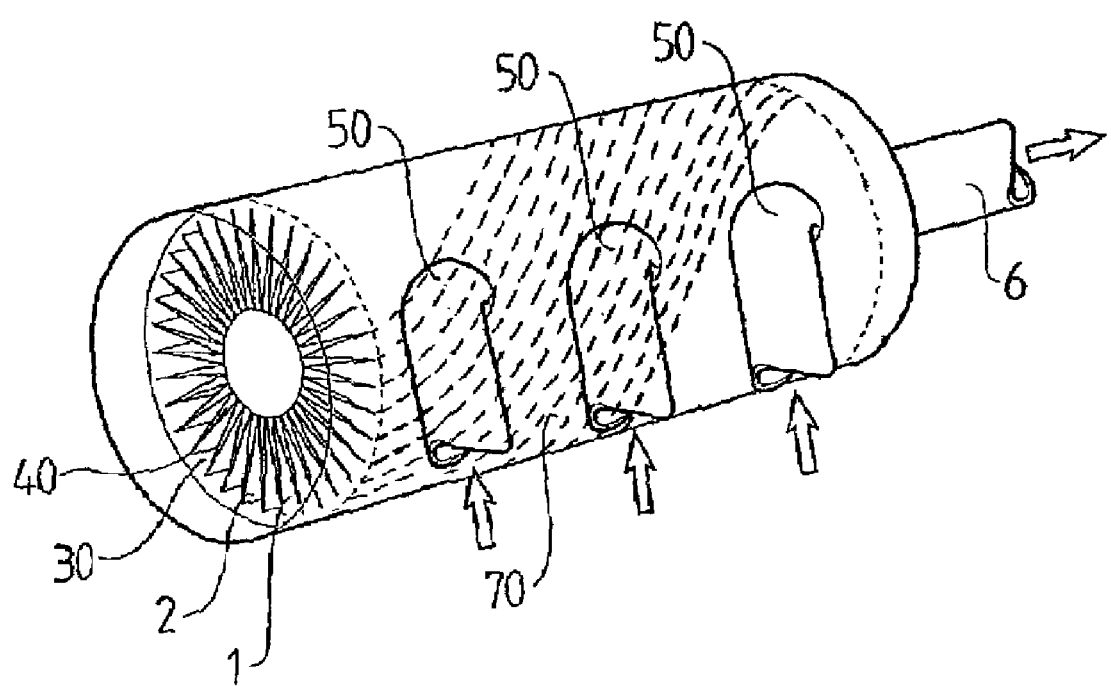
FIG. 7, is a diagrammatical perspective view of a third preferred embodiment of the device of the present invention.

In FIG. 7, a third preferred embodiment of the invention is illustrated and which is a variant of the first preferred embodiment. In the catalyzer body 1 formed by the band 2, the ducts 30, 40 extend along a helical path. In other words, the catalyzer body 1 has a twisted configuration in relation to FIG. 1. This is illustrated in the figure by the dashed lines 70. In this way, opportunities are afforded for arranging the first openings 50 in a row without the openings opening into the same ducts. Three first openings 50 are arranged with a mutual spacing in the longitudinal direction of the casing 11 . More precisely, the openings 50 are arranged along an essentially straight line in the longitudinal direction of the casing. The embodiment according to FIG. 7 is to be preferred when there are specific space limitations. By virtue of the fact that the openings are arranged in a row on the same side of the device, it can be positioned close to the engine and be arranged in a transverse position. It is particularly advantageous for positioning between the engine and a turbo unit of a diesel engine.

The central opening 12 illustrated in FIG. 2, which forms part of the cavity 13, is suitably replaced in the third embodiment by a number of openings that open into the cavity 13. The device is suitably provided with such an outlet opening for each inlet opening 50. The outlet opening that is connected to the left inlet opening in FIG. 7 is then arranged at a corresponding distance to the right in the figure from a central plane through the device. In a corresponding manner, the outlet opening that is connected to the right inlet opening in FIG. 7 is then arranged at a corresponding distance to the left in the figure from a central plane through the device.

The cylinders of the engine are grouped in pairs for each of the first openings 50. The groups are selected so that they originate from cylinders that do not have their exhaust valves simultaneously open.

The term gas as used herein means a gas or gas mixture, such as exhaust gases from an engine of a vehicle, which gas contains pollutants or other compounds that can be removed by means of a catalytic anti-pollution device according to the invention.

The term delimiting surface is intended to include both a surface separated from another surface by a dividing line, such as an edge, and a part of a larger surface. Preferably, an end surface of the body is meant, such as a base surface of the cylindrical body.

It is of course also within the scope of the claims according to the invention for the device to comprise a number of second openings.

Although the above description is directed toward a device arranged in a vehicle for catalytic treatment of produced exhaust gases, such catalytic devices in stationary objects are also within the scope of the appended claims.

Another advantage obtained with the device is improved noise suppression in relation to known solutions.

The invention is not to be considered as being limited to the illustrative embodiments described above, but a number of further variants and modifications are possible within the scope of the patent claims below.

According to an alternative to the third embodiment, the openings 50 are arranged along an essentially straight line at an angle relative to the longitudinal direction of the body. According to a further alternative, the openings 50 are arranged along a curved line.

The catalytic device described above can also be combined with other anti-pollution functions and in this way act as a NOx-storing catalyzer, an SCR catalyzer, a particle-filtering catalyzer and/or a natural gas catalyzer.

According to an alternative to the grouping described above of cylinders for each first opening 5, 50, the number of first openings corresponds to the number of cylinders, and each of the openings is connected to only one cylinder. Each of the openings is therefore connected to one of the cylinders.

According to an alternative to the first embodiment illustrated in FIG. 1, one or more of the openings 5 is, or are arranged in proximity to the catalyzer body end 8 instead of centrally relative to the body 1.

The openings 5 do not have to be arranged at the same distance from the first end 7 of the body, but it is within the scope of the patent claims below for them to be arranged within a region at a distance from the end 7.

The invention claimed is:

1. An apparatus for catalytic treatment of a gas flow comprising:
a device having a catalyzer body that includes a catalytic material, the device further comprising a plurality of first openings for one of (1) entry of gas into and (2) exit of gas out of the catalyzer body, and a second opening for one of (1) exit of the gas entering through the first openings and (2) entry of gas into the catalyzer body for subsequent exit through the first openings, and wherein the first openings are open outward from the catalyzer body on a portion of the body at a distance from a first delimiting surface thereof that defines a first end of the body, toward which delimiting surface the body is adapted to guide at least some of the incoming gas;
the catalyzer body defines an essentially cylindrical shape with an inner cavity that is open toward a second end of the body and the second opening forms part of the inner cavity; and
the catalyzer body further has a zigzag-shaped structure that forms a plurality of ducts for gas throughflow and that are arranged so that every other one of the plurality of ducts in the zigzag structure is connected to at least one of the first openings and remainder of said plurality of ducts are connected to the second opening whereby gas flows in opposite directions in adjacent ducts thereby maintaining uniform temperature over the catalytic material.

2. The apparatus as recited in claim 1, wherein the second opening is open outward, from the catalyzer body, on a portion of the body located opposite the first delimiting surface.

3. The apparatus as recited in claim 1, wherein the first openings are radially oriented on said catalyzer body.

4. The apparatus as recited in claim 1, wherein the first end of the apparatus defined by the delimiting surface is closed.

5. The apparatus as recited in claim 1, wherein the catalyzer body further comprises a band-shaped element that is folded into the zigzag-shaped structure.

6. The apparatus as recited in claim 5, wherein the catalytic material is applied to at least one wall that defines the ducts.

7. The apparatus as recited in claim 5, wherein the first openings are located mid-length along the catalyzer body.

8. The apparatus as recited in claim 5, wherein the first openings are connected to different ducts on one side of the band-shaped element.

9. The apparatus as recited in claim 3, wherein the zigzag-shaped structure forms the cylindrical shape.

10. The apparatus as recited in claim 5, wherein the band-shaped element is adapted in such a manner that each of the ducts extends along an essentially straight line.

11. The apparatus as recited in claim 5, wherein the band-shaped element is adapted in such a manner that each of the ducts extends along a helical line.

12. The apparatus as recited in claim 1, wherein the catalyzer body forms a heat exchanger.

13. The apparatus as recited in claim 12, wherein each of the plurality of ducts for gas throughflow is adapted so that gas entering the body undergoes heat exchange with gas exiting the body.

14. The apparatus as recited in claim 1, wherein the device further comprises a casing that encloses the catalyzer body and the first openings being arranged at the casing.

15. The apparatus as recited in claim 14, wherein the casing has a cylindrical shape.

16. The apparatus as recited in claim 14, wherein the first openings are arranged with a mutual spacing around the casing.

17. The apparatus as recited in claim 14, wherein the first openings are arranged with a mutual spacing in a longitudinal direction of the casing.

* * * * *